Figure 1:
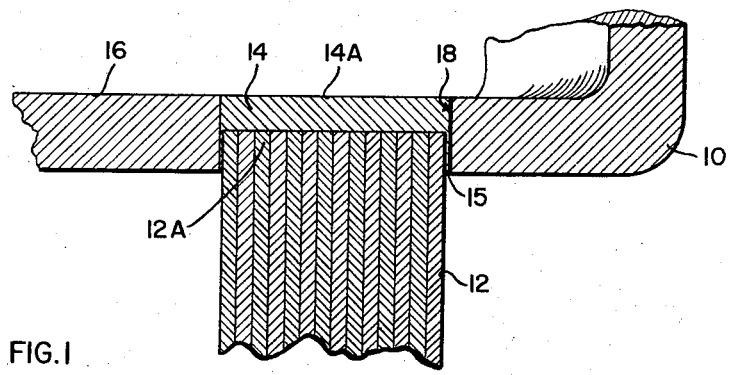

May 5, 1959   B. J. ZAERR   2,885,577
COUPLING OF MAGNETOSTRICTIVE STACK TO DIAPHRAGM
Filed March 4, 1957

INVENTOR.
BASIL J. ZAERR
BY Grover G. Frater
ATTORNEY

United States Patent Office 2,885,577
Patented May 5, 1959

2,885,577

COUPLING OF MAGNETOSTRICTIVE STACK TO DIAPHRAGM

Basil J. Zaerr, Davenport, Iowa, assignor to Bendix Aviation Corporation, Davenport, Iowa, a corporation of Delaware Application March 4, 1957, Serial No. 643,770

10 Claims. (Cl. 310—26)

This invention relates to ultrasonic wave generating and transmitting apparatus. It relates especially to improvements in apparatus in which ultrasonic waves are transmitted by a transducer unit fixed to an ultrasonic transmitter, and to improvements in the connection of such units to an ultrasonic transmitter as well as to methods of production of such apparatus and connections.

In this connection, the term transducer unit defines a transducer core, usually composed of a magnetostrictive material, which may or may not have a wave conducting coupling element fixed to the end of the core.

In apparatus of this type an end of the transducer unit has been attached by brazing or soldering directly to a wave transmitter, such as a container bottom. It has been found that satisfactory junctions of this type are very difficult to produce, since substantial areas must be bonded and the heat can be effectively applied only along the margins of the joint, so that either the heat reaching the center is inadequate, or a substantial portion of the transducer unit is heated by conduction. The latter cannot be permitted because the transducer metal loses its magnetostrictive qualities when heated above its Curie point.

Another difficulty is the strong tendency to trap flux between the abutting faces, which prevents the formation of a bond where flux is present, weakening the joint and impeding the transmission of waves through the junction. When subjected to the action of strong waves from a powerful transducer, such joints frequently break apart, and are also objectionable because of poor wave transmission and heat generation.

An object of the invention is to provide a novel arrangement for mounting a transducer unit on a wave transmitting element, such as a metal container, that will have improved junction strength. Another object is to provide a mounting of this type that will improve the transmission of waves. A further purpose is to provide a mounting of the indicated type that will have the requisite junction strength and continuity without requiring the use of substantially damaging heat. Additional objects are to provide such an arrangement that can be efficiently produced by welding and to provide a novel transducer unit mounting having an improved lateral connection between the transducer unit and the margins of an opening in an ultrasonic transmitter element. In one embodiment of the invention the end of a transducer unit is placed across an opening in a wall of an ultrasonic wave transmitter element and its margins at said end are bonded to the margins of the transmitter opening.

A feature of the invention is the provision of an opening in the ultrasonic wave transmitter wall, and the bonding of the transducer unit to the margins of the opening, with the upper face of the unit in position to contact and transmit ultrasonic waves to the load. Accordingly, a further object is to provide a transducer unit mounting comprising a transducer unit having a coupler fixed to an end of the unit and laterally to an ultrasonic transmitter element such as a container.

A further object of the invention is to provide an improved method of combining a transducer unit and a container for material to be ultrasonically treated which comprises bonding a transducer unit to a container wall having an opening, in such manner that the bonding metal extends across the opening in position for direct wave transmitting contact with the contents of the container.

Advantageously, a wave transmitting and bonding material is applied to the margins of the transmitter element opening and the margins of the transducer unit to form a lateral wave transmitting bond between the transducer unit and transmitter element and then further applying wave transmitting material to the end of the transducer unit to fill the opening in selected degree to form a coupler for direct wave transmitting contact with a load.

Other objects and advantages of the invention will hereinafter appear.

Certain embodiments of the invention are illustrated in the accompanying drawing, it being understood that other embodiments and certain modifications of the embodiments illustrated may be made without departing from the spirit of the invention or the scope of the appended claims.

Figure 2:
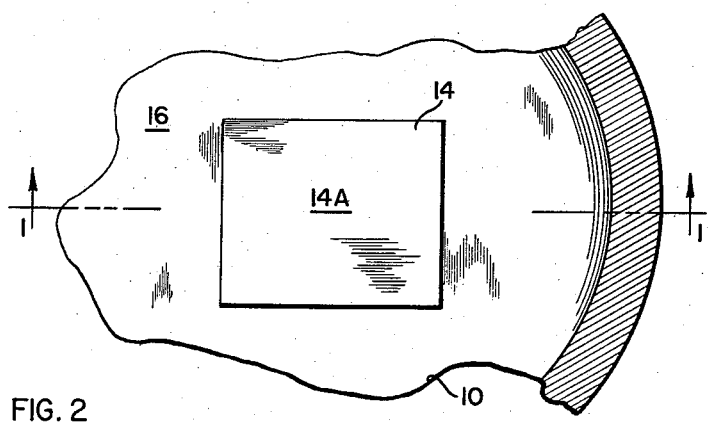
Figure 3:
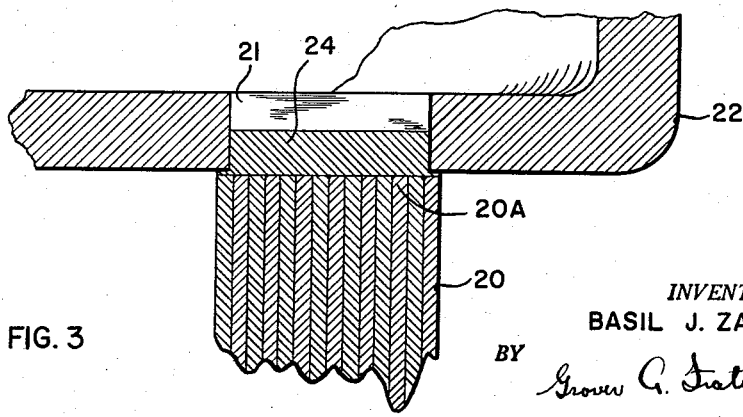

In the drawings:

Fig. 1 is a fragmentary view in section, taken on line 1—1 of Fig. 2, of portions of apparatus embodying the invention, Fig. 2 is a fragmentary top plan view of the apparatus shown in Fig. 1, and Fig. 3 is a fragmentary view in section of an alternative form of the invention.

In Figs. 1 and 2, the numeral 10 generally designates a wall of an ultrasonic wave transmitter element which in operation of the apparatus transmits wave energy from an ultrasonic transducer unit 12 to a load, not shown but normally liquid, which is to be excited or subjected to wave motion.

The ultrasonic wave transmitter advantageously comprises a plate or, in the case of liquid loads, a container. In the latter application the surface 16 will represent an interior wall of the wave transmitting container. It is preferred that the wall 10 be made of metal capable of being welded, brazed or fused.

The transducer unit 12 is composed of magnetostrictive material and is laminated, it being understood that when the unit includes a coupler the latter need not be magnetostrictive or laminated.

A coupler 14 comprises an extension of the transducer unit 12 and is bonded in a longitudinal direction to end 12a of the unit and in a lateral direction to the transmitter wall 10. Surface 14a of the coupler 14 is a continuation of surface 16 of the transmitter wall 10 for transmission of ultrasonic energy to a load together with surface 16.

To produce the ultrasonic exciting unit, an opening 18 of substantially the same cross-sectional area and shape as end 12a of transducer unit 12 is formed through wall 10. The end 12a of unit 12 is then placed across opening 18 in alignment therewith in the opening as shown.

An ultrasonic wave conducting and bonding material is then applied to join the margins of opening 18 with the sides of the end 12a of the transducer unit. The material thus added is designated 15 in the drawing.

Additional ultrasonic wave transmitting and bonding material is applied to the face of end 12a of the transducer unit to join the face with the bonding material at 15 and the transmitter element wall at the margins of opening 18. This adidtional bonding material forms the coupler extension 14.

More than enough bonding material may, advantageously, be applied, and the excess ground away so that surface 14a is flush with surface 16.

The bonding material is advantageously a metal applied in a molten state and preferably under welding conditions so that it will become integral with the wall 10 and transducer unit 12. It is applied and cooled rapidly before a quantity of heat sufficient to destroy the magnestostrictive properties of the transducer core can be conducted a substantial distance into the core. To this end, the bonding material may be applied in stages and allowed to cool between applications.

Stainless steel has the requisite bonding and ultrasonic wave conducting properties. Moreover, it can be welded and it resists corrosion by most liquids. Thus it is an especially good example of materials suitable to the invention.

One advantage of the invention is that the opening 18 and end 12a of the core need not be of exactly the same size and shape and the end 12a of the core may be inserted within opening 18, flush with the lower surface of the wall 10 or even spaced somewhat from the latter, before application of the bonding material. This latitude in placement of the core relative to the wall 10, simplifies manufacture of the unit.

Ultrasonic waves, like other waves, are reflected from points of impedance change. Thus wave energy will be reflected from the junction of a wave transmitter and coupler if not constructed of materials having equal acoustic impedance or if the bond between them is imperfect. Not only are reflected waves lost to the load, but since they are usually reflected out of phase with primary wave travel, they diminish the effective magnitude of unreflected waves. The energy lost is lost as unwanted heat.

Referring to Fig. 1, ultrasonic waves generated longitudinally in the transducer core are transmitted through the coupler 14 directly to the load at surface 14a without traversing a coupler-transducer unit junction. Wave transmission to the load through the transmitter is conducted through the lateral connection of the transducer unit and the transmitter element. Thus the advantage of the larger wave transmitting surface of the transmitter is preserved without the disadvantage of a transmitter junction which reflects ultrasonic waves traveling from the transducer unit in the direction of the load.

In the embodiment illustrated in Figs. 1 and 2, the end of the transducer is shown inserted within the opening in the transmitter wall. While this arrangement is advantageous, other arrangements are possible within the broader aspect of the invention. In an advantageous one of these, illustrated in Fig. 3, the transducer unit 20 is placed across and in alignment with but outside of opening 21 in the wall of a transmitter element 22. The face of the transducer may, as shown, be somewhat larger than the opening.

A homogeneous mass of ultrasonic wave transmitting and bonding material 24 is bonded to the face of the transducer, at end 20a, and to the transmitter wall at the margins of opening 21 within and without the opening.

One feature of the invention lies in the fact that by variation of the thickness of the material 14 in Fig. 1 and 24 in Fig. 2, the length of the coupler which these materials form and the combined length of this coupler and its associated transducer unit can be varied. This permits initial adjustment of the length and impedance of these elements to more closely match their natural resonant frequencies to the frequency at which the transducer is excited for increased efficiency in the generation and transmission of the ultrasonic waves.

In Fig. 3 the ultrasonic wave transmitting and bonding material is exposed to the upper side of transmitter 22 but does not fill the opening 18.

In Fig. 1 the transducer unit 12 is inserted into opening 18 sufficiently far so that surfaces 14a and 16 are flush and so that the bonding material 14 has the desired thickness in the longitudinal direction.

Those skilled in the art use the term ultrasonic to include sonic frequencies within the range of audible frequencies as well as those beyond that range. The term is used in that sense herein and is not limited to inaudible frequencies.

In addition, references herein to ultrasonic wave conducting or transmitting material designate materials having an acoustic impedance in the general range of such impedances of the usual materials of which ultrasonic apparatus is made, such that ultrasonic waves can be effectively transmitted through the material for substantial distances.

I claim:

1. Ultrasonic excitation apparatus comprising an ultrasonic wave transmitter element having an opening formed therethrough and an ultrasonic transducer unit extending into said opening and directly bonded in wave transmitting connection to the margins of said opening.

2. Ultrasonic excitation apparatus comprising an ultrasonic wave transmitting element having an opening formed therein, an ultrasonic transducer unit disposed across said opening in alignment therewith, and ultrasonic wave conducting bonding material interposed between and bonded to said transducer unit and the margins of said transmitter element opening.

3. Ultrasonic excitation apparatus comprising an ultrasonic wave transmitter element, an ultrasonic transducer unit on one side of said transmitting element, and an ultrasonic coupler bonded to said transmitter and to said transducer unit and having a wave transmitting surface exposed to the opposite side of said transmitting element.

4. Ultrasonic apparatus for excitation of a liquid load, comprising an ultrasonic wave transmitting container, an ultrasonic transducer unit, and an ultrasonic coupler fixed to said transmitting container and said transducer unit and having a wave transmitting surface exposed to the interior of said transmitting container for direct wave transmitting contact with said liquid load.

5. Ultrasonic excitation apparatus comprising an ultrasonic wave transmitting container having a metallic wall provided with an opening, an ultrasonic transducer unit having an end disposed across said opening, ultrasonic wave transmitting bonding material interposed between and bonded to the margins of said end of said unit and the margins of said opening, and an ultrasonic wave transmitting coupler bonded to said end of said transducer unit and the margins of said opening.

6. The invention defined in claim 5 in which said wave transmitting coupler fills said opening in said transmitting container.

7. The method of coupling an ultrasonic transducer unit to an ultrasonic wave transmitter element which comprises making an opening through a wall of the transmitter substantially the same in cross-sectional area and shape as the cross-sectional area and shape of an end of the transducer unit, placing said end of said unit in close proximity to said wall in alignment with said opening, bonding the margins of said opening to said end of said unit by the addition of ultrasonic wave conducting and bonding material bonded to and extending from the end surface of said unit to said margins of said opening.

8. The method defined in claim 9 in which the opening in the wall of the transmitter is larger in cross-sectional area than the cross-sectional area of said end of said unit whereby to preclude longitudinal reflection of waves in said transducer unit from said transmitter.

9. A method of coupling an ultrasonic transducer unit to an ultrasonic wave transmitter element which comprises, making an opening through a wall of the transmitter, placing an end of said transducer unit within said opening, bonding the margins of said opening to said end of said unit and to the margins of said end of said unit by the addition of ultrasonic wave conducting bonding material bonded to and extending between said margins and said end of said unit.

10. The method of coupling an ultrasonic transducer unit comprising a magnetostrictive core to a metallic wave transmitter element which comprises making an opening in a wall of the transmitter of size to receive an end of said unit, placing said end of the unit across said opening, bonding the margins of said opening to the margins of said end of said unit, filling said opening with ultrasonic wave conducting metal applied in molten state under welding conditions, and cooling said transducer unit prior to conduction of heat to the unit sufficient to raise the core temperature above its Curie point a substantial distance into said core.

References Cited in the file of this patent

UNITED STATES PATENTS

| | | |
|---|---|---|
| 1,380,869 | Fay | June 7, 1921 |
| 2,636,998 | Davis | Apr. 28, 1953 |
| 2,714,303 | Bodman | Aug. 2, 1955 |
| 2,779,695 | Brown | Jan. 29, 1957 |

FOREIGN PATENTS

| | | |
|---|---|---|
| 614,498 | Germany | June 11, 1935 |